(12) United States Patent
Pedersen et al.

(10) Patent No.: US 8,067,872 B2
(45) Date of Patent: Nov. 29, 2011

(54) PERMANENT MAGNET ROTOR HAVING SLANTED OR CURVED GROOVES

(75) Inventors: Henrik Ørskov Pedersen, Silkeborg (DK); Keld Folsach Rasmussen, Bjerringbro (DK); Kjeld Hellegaard, Bjerringbro (DK)

(73) Assignee: Grundfos a/s, Bjerringbro (DK)

( * ) Notice: Subject to any disclaimer, the term of this patent is extended or adjusted under 35 U.S.C. 154(b) by 135 days.

(21) Appl. No.: 11/719,168

(22) PCT Filed: Nov. 7, 2005

(86) PCT No.: PCT/EP2005/011870
§ 371 (c)(1),
(2), (4) Date: Dec. 6, 2007

(87) PCT Pub. No.: WO2006/050884
PCT Pub. Date: May 18, 2006

(65) Prior Publication Data
US 2009/0127961 A1   May 21, 2009

(30) Foreign Application Priority Data
Nov. 12, 2004 (EP) .................................. 04026962

(51) Int. Cl.
*H02K 1/27* (2006.01)
*H02K 21/14* (2006.01)
(52) U.S. Cl. .......... 310/156.53; 310/156.48; 310/156.57
(58) Field of Classification Search ............. 310/156.53, 310/156.48, 156.57; *H02K 21/14, 1/22, 1/27*
See application file for complete search history.

(56) References Cited

U.S. PATENT DOCUMENTS

| | | | | |
|---|---|---|---|---|
| 5,679,995 A | * | 10/1997 | Nagate et al. | 310/156.54 |
| 5,760,520 A | * | 6/1998 | Hasebe et al. | 310/156.19 |
| 2004/0004407 A1 | * | 1/2004 | Laurent et al. | 310/156.48 |
| 2004/0189132 A1 | * | 9/2004 | Horst | 310/209 |

FOREIGN PATENT DOCUMENTS

| | | |
|---|---|---|
| DE | 199 33 009 A1 | 2/2000 |
| EP | 1 009 085 A2 | 6/2000 |
| EP | 1 009 085 A3 | 2/2001 |
| JP | 8-223831 A | 8/1996 |
| JP | 2000-139063 A | 5/2000 |
| JP | 2000-278895 A | 10/2000 |
| JP | 2000278895 A | * 10/2000 |
| JP | 2004-048912 A | 2/2004 |
| WO | 03/065550 A1 | 8/2003 |

* cited by examiner

*Primary Examiner* — Quyen Leung
*Assistant Examiner* — Michael Andrews
(74) *Attorney, Agent, or Firm* — Panitch Schwarze Belisario & Nadel LLP (57) ABSTRACT

The invention relates to a permanent magnet rotor for an electric motor, in which the permanent magnets inside the rotor extend parallel to the rotation axis of the rotor, and in the area of the radially outer longitudinal edges of the permanent magnets, grooves that are open to the outside are formed on the outer periphery of the rotor. These groves are each, in a peripheral direction, slanted or curved with regard to the longitudinal edge of the adjacent permanent magnets. The center line of each groove intersects the longitudinal edge of the adjacent permanent magnet at least once. The grooves on the outside of the rotor have, in the peripheral direction, a smaller width than in an area of the groove situated radially further inside, and the cross-sectional shape of the groove is constant over the length of the rotor. The invention also relates to a method for producing a rotor of the aforementioned type.

17 Claims, 8 Drawing Sheets

PERMANENT MAGNET ROTOR HAVING SLANTED OR CURVED GROOVES

CROSS-REFERENCE TO RELATED APPLICATIONS

This application is a Section 371 of International Application No. PCT/EP2005/011870, filed Nov. 7, 2005, which was published in the German language on May 18, 2006, under International Publication No. WO 2006/050884 A1 and the disclosure of which is incorporated herein by reference.

BACKGROUND OF THE INVENTION

The invention relates to a permanent magnet rotor for an electric motor, as well as to a method for manufacturing such a permanent magnet rotor.

With permanent magnet motors, permanent magnets are arranged in the rotor, distributed over the periphery. Block-like permanent magnets are applied for an as inexpensive as possible construction of the rotor, and these extend parallel to the rotation axis of the rotor in the inside of the rotor. This arrangement has the disadvantage, that the course of the torque of the motor has undesirable peaks or waves. In order to achieve a more uniform torque course, it is known to form free spaces or grooves in the rotor, in the region of the edges of the permanent magnets, and the magnetic flux is interrupted or reduced in their course. The grooves are designed in a helical manner or running in an oblique manner, in order thus to achieve a more uniform torque course. Grooves formed on the outer periphery of the rotor however lead to a larger air gap between the rotor and the stator, and thus to a loss of efficiency.

BRIEF SUMMARY OF THE INVENTION

It is therefore the object of the invention to provide an improved permanent magnet rotor for an electric motor, which permits a more uniform course of torque with an as high as possible efficiency.

A permanent magnet rotor for an electric motor achieves this object with the features specified in claim 1. A particularly favorable method for manufacturing such a permanent magnet rotor is achieved with the features specified in claim 15. Preferred embodiments result from the associated dependent claims.

With the permanent magnet rotor according to the invention, the permanent magnets are arranged in the inside of the rotor parallel to the rotation axis of the rotor. Thereby, one may arranged block-like permanent magnets, which in the width direction extend either radially or tangentially in the inside of the rotor. Outwardly opened grooves are formed in the rotor in the region of the radial outer longitudinal edges, i.e. in the region of the longitudinal edges of the permanent magnets which are situated closest to the outer periphery of the rotor. These grooves run inclined or curved to the longitudinal edge of the adjacent permanent magnet in the peripheral direction, i.e. essentially helically along the peripheral surface of the rotor. Peaks in the torque are moderated on rotation of the rotor due to these grooves, and a more uniform torque course is achieved. The grooves thereby are arranged such that the middle line of each groove crosses the longitudinal edge of the adjacent permanent magnet at least once. By way of this, the whole longitudinal edge of the permanent magnets may be magnetically insulated with respect to the outer periphery of the rotor and the stator, by the groove, in order to improve the course of the torque.

Furthermore, the grooves on the outer side of the rotor in the peripheral direction have a smaller width than in a region of the groove lying further radially inwards, wherein the cross-sectional shape of the groove is constant over the length of the rotor. I.e. the cross section of the groove in the rotor is merely offset in a helical manner in the peripheral direction over the length of the rotor, but is otherwise constant. The air gap of the rotor, which faces the stator, may be kept small in the region of the groove by way of the fact that the groove width is narrow on the outer periphery, so that the loss in efficiently due to the groove is minimised. Due to the widening of the groove towards the inside of the rotor, one succeeds in the groove at the end region facing the permanent magnet having such a large width, that the groove sufficiently covers the longitudinal edge of the permanent magnet even with a larger pitch of the groove, in order to interrupt the magnetic flux in the inside of the rotor core in this region. The magnetic flux between the north pole and the south pole of the magnet in the inside of the rotor is interrupted in the region of the longitudinal edge of the magnet by way of the radially inwardly facing, wider base region. By way of this, it is ensured that the magnetic flux is led chiefly via the stator, by which means a higher efficiency of the motor is ensured.

Preferably, at least an equal amount of grooves as permanent magnets is present, so that a sufficient magnetic insulation is realised by the grooves at each end edge of the permanent magnet. The permanent magnets may thereby be arranged in a radially directed manner in the rotor, or directed in a tangential or chord-like manner in the rotor.

Preferably, the rotor consists of at least two premanufactured rotor modules which are joined to one another in the longitudinal direction, wherein permanent magnet sections are arranged in each of the rotor modules, and each of the rotor modules comprises groove sections on its outer periphery, wherein with joined-together rotor modules, the groove sections of the individual rotor modules together form the grooves, and the permanent magnet sections of the individual rotor modules together form the permanent magnets of the rotor. Rotors of a different length may be formed by way of combination of different rotor modules. On assembly, one merely needs to join the individual rotor modules onto one another. It is subsequently no longer necessary to insert the permanent magnets into the assembled rotor, since the permanent magnets consist of individual permanent magnet sections, which are already arranged in the rotor modules. It is also not necessary to keep ready differently long permanent magnets for differently long (in the direction of the rotor longitudinal axis) rotors. The permanent magnet sections of the individual rotor modules, on assembly into a complete rotor, are preferably arranged such that in each case a permanent magnet section of one rotor module is aligned to a permanent magnet section of the second rotor module. This means that the permanent magnet sections form permanent magnets which extend over the entire length of the rotor parallel to its rotation axis. The groove sections on the individual rotor modules are preferably designed such that they connect to one another when the rotor modules are joined together, and thus form continuous grooves on the outer periphery of the rotor.

This may be made possible for example by way of the groove sections of each rotor module being inclined to the longitudinal edge of the adjacent permanent magnet section, in a manner such that on each end-side of the rotor modules, the middle lines of the groove sections in the peripheral direction in each case have the same predefined distance to the longitudinal edge of the permanent magnet section. This ensures that the permanent magnet section and the groove section always have a defined distance to one another at the end-side of the rotor module. Thus one creates an interface which is identical with all rotor modules, and which permits the arrangement of the individual rotor modules such that the permanent magnet sections as well as the groove sections are aligned to one another or connected to one another, at the end-sides of the rotor modules. A continuous groove in the region of an adjacent permanent magnet which is composed of several permanent magnet sections in the longitudinal direction of the rotor, is formed in this manner.

It is furthermore preferable for the middle lines of each groove section to cross the longitudinal edge of the adjacent permanent magnet section at least once. This means that the associated groove section extends radially in an outer-lying manner obliquely over the longitudinal edge of the associated permanent magnet section. In the case that the groove section crosses the adjacent longitudinal edge of the permanent magnet section only once or an odd number of times, the ends of the groove section at the two opposite end-sides of the rotor module in the peripheral direction are arranged at opposite sides of the associated longitudinal edge of the permanent magnet. In order to be able to assemble a rotor with continuous grooves from such rotor modules, either rotor modules with differently, i.e. oppositely inclined groove sections must be provided, or differently, i.e. oppositely inclined groove sections must be provided in the rotor module itself, so that two rotor modules, when they are rotated at a certain angle to one another, may be applied on one another, such that continuous zigzag grooves are formed on their outer periphery.

It is alternatively possible for the groove sections on the rotor modules, with their middle lines, in each case to cross the longitudinal edge of the adjacent permanent magnet segment several times. In the case that the groove section with its middle line crosses the longitudinal edge of the permanent magnet section twice or another number of even times, the ends of the groove sections at the two end-sides of the rotor module are always distanced in the same peripheral direction to the longitudinal edge of the permanent magnet section.

The rotor further preferably comprises at least two rotor modules, which are differently long in the direction of the rotation axis of the rotor, by which means a finer graduation of the different rotor lengths which may be assembled from the rotor modules, may be achieved.

At least one of the rotor modules preferably comprises groove sections which in each case are formed angled in a manner such that the middle lines of the groove sections, at the two opposite end-sides of the rotor module, in the peripheral direction, are distanced equally far in the same direction from the longitudinal edge of the adjacent permanent magnet. Such an arrangement is in particular advantageous in the case described above, in which the groove sections with their middle lines cross the adjacent longitudinal edges of the rotor modules twice or another even number of times. This arrangement permits all thus designed rotor modules to be applied onto one another in an infinite manner, wherein the groove sections of the individual rotor modules meet at the interfaces between the individual rotor modules, so that continuous grooves may be formed at the outer periphery of the rotor. The groove sections of the individual rotor modules thereby preferably connect to one another at the interfaces between the individual rotor modules, such that an angle or angled bend is formed in the groove at the interface between the rotor modules.

The grooves and/or the groove sections run for example in a zigzag manner to the longitudinal edge of the adjacent permanent magnet or permanent magnet section. The zigzag course of the groove may either be the result of rotor modules with oppositely inclined groove sections being joined to one another, or of the groove sections themselves already running in a zigzag manner in a rotor module. The zigzag course of the grooves or groove sections has the advantage that already one may ensure in each rotor module, that the groove section present there, extends over the longitudinal edge of the adjacent permanent magnet section in the desired peripheral region or rotation angle, in order to ensure a smoothed torque course of the motor. Different rotor modules formed in this manner may then be assembled in an infinite manner in order to design rotors of a different length, wherein it is always ensured that the longitudinal edges of the permanent magnets are covered uniformly by obliquely running grooves, over the whole rotor length, in order to achieve a uniform course of the torque.

Preferably, the grooves are in each case designed such that they in each case essentially cover at least the longitudinal edge of the adjacent permanent magnet in the radial direction over the whole rotor length. This means that seen over the length of the rotor, the outer longitudinal edges of the permanent magnets at the outer periphery of the rotor are covered by an obliquely running groove, at each location of the rotor. The groove preferably has such an inclination angle and such a groove width, that it essentially covers or contacts the longitudinal edge of the permanent magnet at each location, despite the pitch. Thereby, the covering is designed such that a part of the groove is always present on the outer periphery of the rotor, seen radially outwards from the longitudinal edge of the permanent magnet.

The grooves are further preferably arranged such that in each case, one groove covers the radially outer longitudinal edges of two adjacent permanent magnets in the radial direction. This embodiment makes particular sense for an arrangement of permanent magnets with which the permanent magnets extend in the direction of chords, tangentially in the inside of the rotor. With this arrangement, the longitudinal edges of two permanent magnets adjacent one another always face one another and are directly adjacent one another. The radially outer longitudinal edges of two permanent magnets which are adjacent one another, may be covered by an obliquely running groove on account of the small distance between the longitudinal edges of the permanent magnets. Thereby, the groove or the groove sections from which the groove is formed, have an inclination angle to the rotor longitudinal axis, and a groove width, which are selected such that the two longitudinal edges of the permanent magnets adjacent one another are covered by the groove in the radial direction, at each location along the rotor longitudinal axis. I.e., proceeding from the longitudinal edges in the radial direction to the outside, a part of the groove or a groove section is located at each position in the direction of the rotor longitudinal axis.

Furthermore, the grooves or the groove sections forming the grooves have a swallowtail cross-section. This cross-sectional shape permits the groove at the outer periphery of the rotor to have an as small as possible width, whilst it widens to the inside of the rotor, and in the region of the groove base has the largest width in the peripheral direction. Thereby, the groove base is preferably so wide, that the longitudinal edge of the adjacent permanent magnet or the longitudinal edges of the permanent magnets adjacent to one another are covered by a part of the groove base, at each position in the direction of the rotor length.

According to a further preferred embodiment, free spaces are formed adjacent the longitudinal edges of the permanent magnets in the surrounding material of the rotor, and these free spaces are preferably in connection with an adjacent groove. These free spaces at the longitudinal edges of the permanent magnets prevent or reduce a magnetic short circuit through the rotor material, so that it is ensured that the magnet flux runs essentially over the stator.

Preferably, the rotor is formed of a plurality of rotor laminations which are layered on one another, wherein the free spaces are only formed in a part of the rotor laminations, and extend preferably between two adjacent permanent magnets. The rotor or its rotor modules are formed of individual rotor laminations, which for example are layered on one another in the interlocking method. In particular, when free spaces are formed on the longitudinal edges of the permanent magnets, which are in connection with the adjacent grooves at the outer periphery of the rotor, it may be preferable not to form the free spaces in each rotor lamination, but for webs to remain in individual rotor laminations in the respective regions, in order to hold together the individual rotor segments between the permanent magnets and the grooves.

According to a further embodiment of the invention, the rotor and the individual rotor modules are formed of a multitude of rotor laminations or are assembled, solid, preferably sintered segments, wherein receiver spaces for the permanent magnets are formed between the segments which are adjacent to one another. With this design, the permanent magnets extend in the radial direction in a spoke-like manner between the rotor segments. Preferably, the obliquely running grooves are also formed between the individual rotor segments, i.e. the rotor segments in the peripheral region of the rotor have a distance to one another which defines the groove. In order to be able to assemble the rotor of several rotor modules, accordingly, the individual rotor modules may be assembled from rotor module segments, wherein permanent magnet sections are arranged between the rotor module segments, and the obliquely running groove sections are formed on the outer periphery.

It is further preferable to arrange electrical leads in at least a part of the grooves or in additional channels formed in the rotor. With a modularly constructed rotor, for this, one may provide suitable grooves or channels with electrical leads arranged therein, in each rotor module, wherein on assembly of the rotor modules, the individual lead sections come into contact with one another at the interfaces between the rotor modules, in order to form continuous electric leads in the longitudinal direction of the rotor. These leads may for example be produced by casting out the grooves or channels with copper. This arrangement of the leads permits the design of the rotor for use in a line-start motor, which represents a hybrid motor which on starting is operated in the manner of an asynchronous motor, and in later operation as a permanent magnet motor. Preferably, the electrical leads are arranged in channels at the outer periphery of the rotor, wherein the channels extend parallel to the grooves open to the outside, i.e. likewise run obliquely to the rotation axis of the rotor in the peripheral direction. The channels, in which the electrical leads are arranged, may be open towards the outer periphery of the rotor, or also be formed as closed channels in the inside of the rotor.

The invention further relates to a method for manufacturing a permanent magnet rotor according to the previous description. According to this method, the rotor is assembled of a multitude of rotor laminations, wherein the individual rotor laminations are consecutively punched in the sequence in which they are assembled. The punching of the individual rotor laminations is preferably effected consecutively from a sheet metal strip. After each punching procedure, the tool for punching the grooves on the outer periphery of the rotor is rotated by a predefined angle about its longitudinal axis which corresponds to the rotor rotation axis. I.e. in each lamination, the groove is offset in the peripheral direction by a certain angle with respect to the preceding lamination. The grooves on the outer periphery of the rotor which are inclined with respect to the longitudinal edges of the permanent magnets now result when the individual laminations are then stacked onto one another. A number of recesses for the permanent magnets are simultaneously punched in each rotor lamination on punching. These recesses are preferably punched in each rotor lamination at the same angular position, i.e. the tool for punching the recesses is not rotated after each punch procedure as is the case with the tool for punching out the grooves. In this manner, the permanent magnets may be inserted into the rotor after assembling the rotor laminations in the longitudinal direction of the rotor, such that the permanent magnets extend parallel to the rotor longitudinal axis. The permanent magnets preferably have a length which in each case corresponds to the length of the rotor in the direction of the rotation axis of the rotor.

It is further preferable for the rotor to be assembled of at least two premanufactured rotor modules. Thereby, the individual rotor modules, as described previously for the whole rotor, are assembled in each case of a multitude of rotor laminations. The individual rotor laminations of a rotor module are consecutively punched in the sequence in which they are assembled. Thereby, the tool for punching the grooves at the outer periphery of the rotor is rotated by a predefined angle about its longitudinal axis after each punching procedure. Parts of the grooves which are peripherally offset to one another are punched in each lamination of the rotor module by way of this. When the individual laminations of the rotor module are applied on one another, the inclined groove sections formed on the outer periphery of the rotor module are formed by the groove parts punched in each rotor module in an offset manner. After assembling the rotor laminations into a rotor module, permanent magnet sections which fit with the length of the rotor modules are applied into the rotor module. Recesses are punched in the rotor laminations for the permanent magnet sections, and these recesses are provided at the same angular position in each rotor lamination, so that the permanent magnet section may be inserted into the rotor module parallel to the rotation axis.

Rotor modules of certain lengths are further preferably premanufactured for forming rotors with different lengths. The premanufactured rotor modules may then by joined to one another in different, preferably infinite combinations, according to the desired rotor length to be formed. The individual rotor modules are premanufactured such that permanent magnet sections which extend parallel to the rotation axis of the rotor module over its axial length are arranged in them. Furthermore, the rotor modules in each case on the outer periphery comprise groove sections which are inclined to a radially outer longitudinal edge of an adjacent permanent magnet section, wherein the permanent magnet sections may extend for example in the direction of a chord or radially in the inside of the rotor module. A different number of rotor modules are joined onto one another in the longitudinal direction, depending on the desired rotor length, wherein the permanent magnet sections of the individual rotor modules are preferably arranged aligned to one another, so that permanent magnets are formed in the rotor, which extend through the rotor over the whole rotor length parallel to the rotation axis of the rotor. The groove sections of the individual rotor modules thereby preferably connect to one another, as described above, such that continuous, inclined grooves extending over the whole rotor length, and which run in a zigzag manner as the case may be, are formed. Thereby, the grooves cover the longitudinal edges of the adjacent permanent magnets, preferably over the whole length of the rotor.

For example, at least two, preferably three types of rotor modules with a different module length are provided. I.e. the several, preferably three rotor modules designed differently long may be combined infinitely with one another, in order to be able to manufacture the rotor lengths resulting from the given graduations, according to requirement.

The graduations are preferably selected such that a second type of rotor module has a module length which is longer than the module length of the first type of rotor module by half. Thereby, a third type of rotor module is preferably also provided, which has a module length which has double the length of the module length of the first type of rotor module. A graduation for the different rotor lengths which may be assembled from these rotor modules, and which correspond to half the module length of the first type of rotor module, arises from this.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
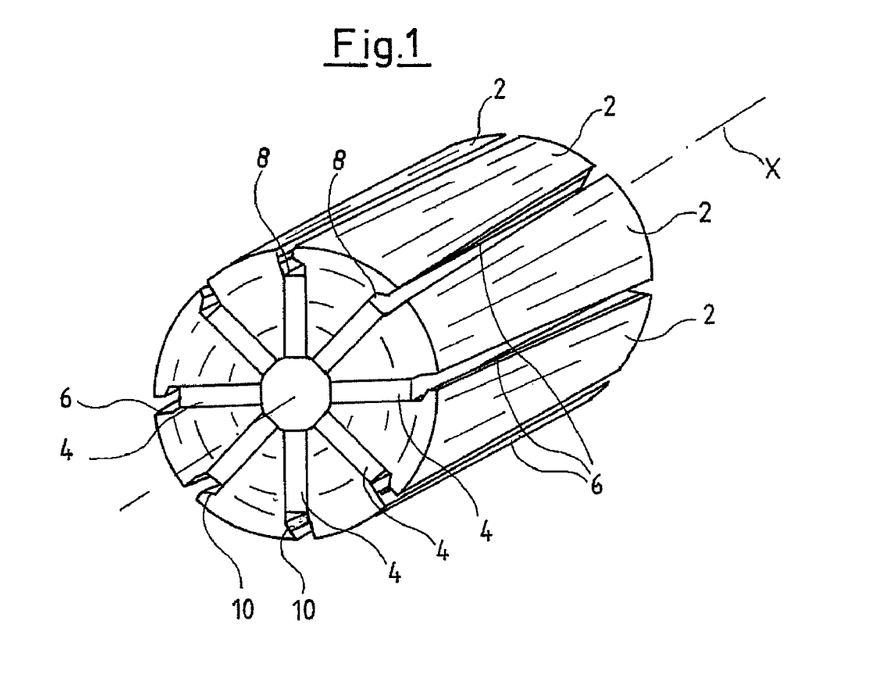
FIG. 1 a schematic perspective view of a rotor according to a first embodiment of the invention, FIG. 2 a schematic perspective view of a rotor according to a second embodiment of the invention, FIG. 3 a perspective view of a rotor according to a third embodiment of the invention, FIG. 4 a detailed view of the rotor according to FIG. 3, FIG. 5 a first rotor lamination of the rotor according to FIGS. 3 and 4, FIG. 6 a second rotor lamination of the rotor according to FIGS. 3 and 4, FIG. 7 a perspective view of a rotor according to a further embodiment, FIG. 8 a detailed view of the rotor according to FIG. 7, FIG. 9 a perspective view of a rotor according to a further embodiment of the invention, FIG. 10 a detailed view of the rotor according to FIG. 9, FIG. 11 a rotor lamination of a rotor according to the invention, FIG. 12 schematically, the assembly of a rotor according to the invention and FIG. 13 schematically, the design of rotors of different length, from premanufactured rotor modules.

The rotor shown in FIG. 1 is constructed from eight identical rotor segments 2, which may be preferably manufactured of sintered metal parts. The rotor segments 2 are designed conically and are arranged alternately rotated by 180° to one another, so that a rotor element with its wide end-side always comes to lie between the narrow end-sides of two adjacent rotor elements 2. The rotor segments 2 are in each case arranged distanced to one another, so that free spaces extending in the radial direction and in which permanent magnets 4 are arranged, are formed between the rotor segments 2. The permanent magnets 4 extend in the radial direction and are thus arranged as a whole in a star-like manner. Thereby, the permanent magnets 4 do not extend in the radial direction up to the outer periphery of the rotor. Rather, the free spaces between the rotor segments 2 are designed as grooves 6 on the radial side of the permanent magnets 4, and these grooves are open towards the outer periphery of the rotor. The grooves 6 are designed such that they have a constant gap width over the whole length of the rotor along the rotation axis X of the rotor 6, on the outer periphery. Furthermore, the grooves 6 extend obliquely over the periphery of the rotor, so that they run inclined with respect to the radial outer longitudinal edges 8 of the permanent magnets 4. The grooves 6 thus run rotated or helically on the periphery of the rotor. This oblique course of the grooves 6 is achieved by the conical design of the rotor segments 2, i.e. by the rotor segments 2 at a longitudinal end having a smaller cross-sectional surface than at the opposite end.

The grooves 6 are furthermore designed such that at the outer periphery, they have a smaller width than on the groove base lying radially further inwards, i.e. the region connecting to the permanent magnets 4. This is achieved by a step-like widening of the groove at a longitudinal end of the rotor segment 2. With the conical design of the rotor segments 2, the step-like widening 10 is formed in each case at the longitudinal end of the rotor segment 2 with the larger cross-sectional area. The step-like widening 10 runs with the tapering of the rotor segment 2 towards the opposite longitudinal end, so that the step-like widening 10 is no longer present at this opposite end 2. By way of the fact that the rotor segments 2 are always arranged alternately rotated by 180°, in the course of each grove 6, one succeeds in the step-like widening 10 changing from the one groove side to the other groove side, according to the inclined course of the grooves 6.

By way of the described design, one succeeds over the whole length of the rotor in the direction of the rotation axis X, in the radially outer longitudinal edges 8 or the radially outwardly directed end-surface of the permanent magnets 4 being covered by grooves 6, so that the free spaces of the grooves adjacent the permanent magnets 6 form a magnetic insulation, which prevents the magnetic short circuit between the north pole and south pole of the magnet in the inside of the rotor, i.e. through the rotor segments 2. By way of this, the magnetic flux is ensured over the stator of the motor (not shown here) and thus a higher motor efficiency. The grooves are formed more narrowly towards the outer periphery, so that here, the magnetic flux is interrupted as little as possible due to the grooves, and thus an as uniform as possible course of the torque of the motor may be achieved.

Figure 2:
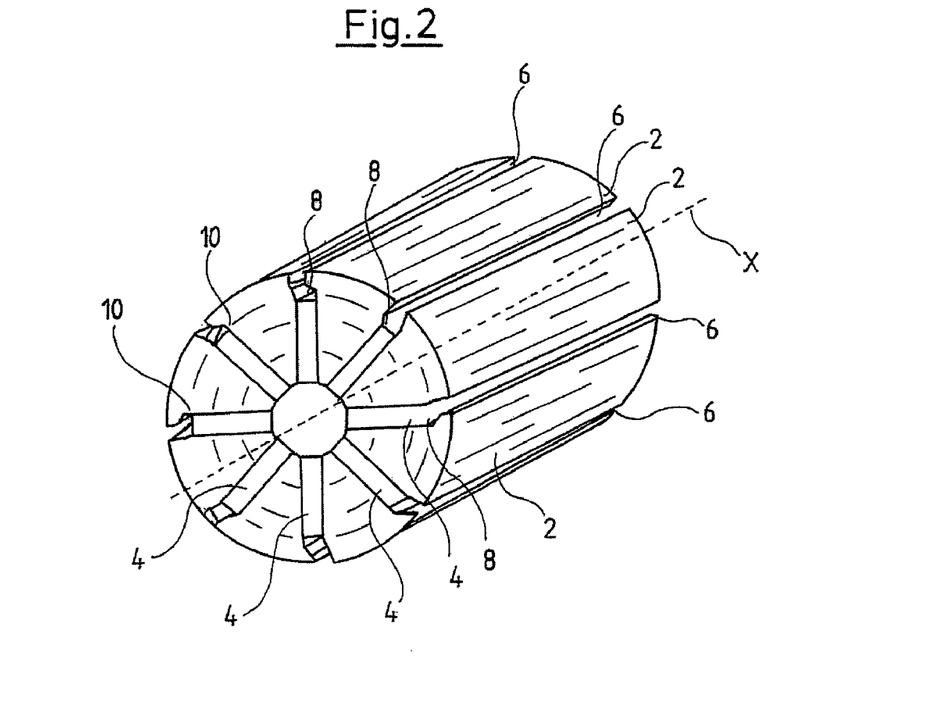

Whereas with the rotor shown in FIG. 1, the grooves 6 at the outer periphery of the rotor are inclined in an alternating manner in the opposite direction along the periphery of the rotor on account of the conical design of the rotor segments, the rotor shown in FIG. 2 is designed such that all grooves 6 in the course from the one end-side of the rotor to the opposite end-side of the rotor run inclined in the same peripheral direction. As also with FIG. 1, the grooves thereby run in a straight manner and are inclined at an angle to the longitudinal edges 8 of the adjacent permanent magnets 4. The arrangement of the permanent magnets 4 between the rotor segments 2 corresponds to the arrangement according to FIG. 1. With the embodiment according to FIG. 2, all rotor segments 2 are likewise identical, preferably designed as sinter components. In contrast to the embodiment according to FIG. 1, the rotor segments 2 are however all arranged in the same direction, so that the equally inclined grooves 6 are formed between the rotor segments 2. With this embodiment too, the grooves 6 have a step-like widening 10 in the regions facing the permanent magnets 4.

Each step-like widening 10 on the rotor segments 2 is designed such that at an end-side of the rotor segments 2, it is formed in each case on a longitudinal edge of the rotor segments. The widening 10 decreases up to the opposite end-side in the course of the longitudinal edge, so a widening is no longer formed there on the same longitudinal edge. Conversely, the opposite longitudinal edge of the rotor segment 2 is designed such that the widening 10 increases over the course of the longitudinal edge, so that no widening is formed on this longitudinal edge of the rotor segments at the first end-side, and a widening 10 is formed at the opposite end-side. Thus the rotor segments are formed in an identical manner at their two end-sides, so that they are formed point-symmetrically to the middle of the rotor segments 2, and the rotor segments 2 may thus be assembled rotated by 180° in an infinite manner. By way of the narrow design of the grooves at the outer periphery, it is ensured with this arrangement too, that there, the magnetic flux to the stator is upset as little as possible, whilst the wide design of the grooves at the radially outer end-faces of the permanent magnets 4 ensures that an adequate magnetic insulation is provided there. The grooves 6 cover the longitudinal edges 8 or the radially outer end-faces of the permanent magnets 4 over the whole rotor length, in the radial direction.

Figure 3:
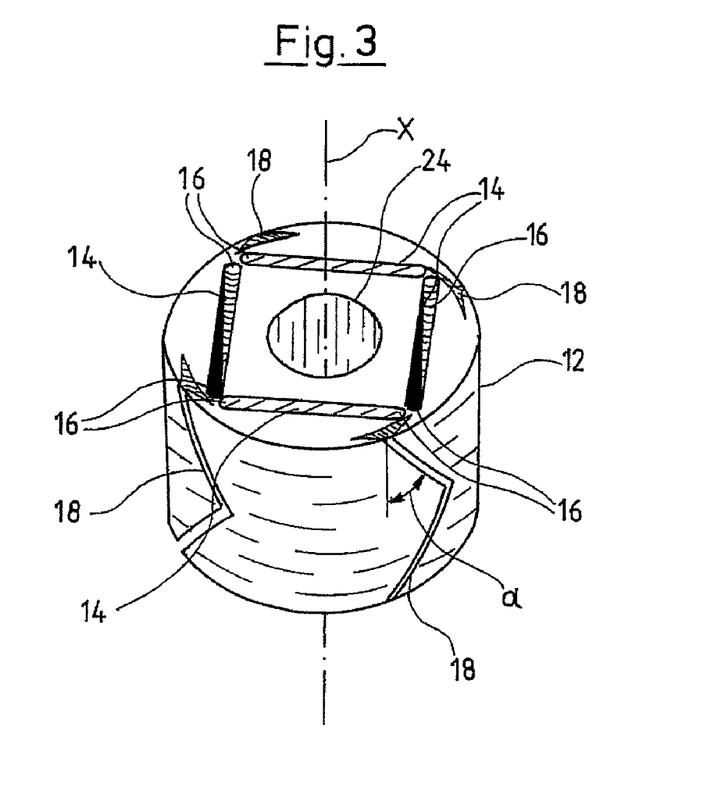

FIG. 3 shows a rotor which consists of a multitude of rotor laminations which are applied on one another in the direction of the rotational axis X of the rotor. In each case, four slots 14 are formed in the rotor laminations 12, and these slots extend in the direction of a chord, i.e. normally to the radius in the rotor laminations. The slots 14 are arranged in each rotor lamination 12 at the same angular position with respect to the rotation axis X, so that the slots 14, when the rotor laminations 12 are stacked on one another, form recesses extending in the longitudinal direction through the rotor, into which permanent magnets are inserted such that they extend parallel to the rotation axis X.

Grooves 18 are formed on the outer periphery of the rotor in the region of the end-edges of the slots 14, i.e. of the radially outer-lying longitudinal edges 16 of the recesses formed by the slots 14, and these grooves in their functioning correspond to the grooves described by way of FIGS. 1 and 2. With the embodiment according to FIG. 3, the grooves 18 run in a V-shaped or zigzag-like manner, so that they cross the region of the longitudinal edges 16 of the slots 14 twice over the length of the rotor. As may be seen more clearly in the enlargement in FIG. 4, the grooves 18 are designed in the manner of a swallowtail in cross section. This means that the grooves 18 in the region of the opening towards the outer periphery of the rotor have a narrow groove width in the peripheral direction, so that only a narrow, opened gap is directed to the outer periphery. The groove 18, proceeding from this gap 20, widens radially inwards, so that at the groove base, i.e. the region facing the longitudinal edges 16 of the slots 14, it has a much larger groove width in the peripheral direction. This groove width a at the groove base, which in its functioning corresponds to the widening 10 with the embodiment examples according to FIGS. 1 and 2, is matched to the inclination angle α of the groove with respect to the rotor longitudinal direction or the edges 16. The groove width a is selected such that with the inclination of the groove at the inclination angle α, the longitudinal edges 16 of the slots 14 in the radial direction are covered by the groove or the groove base in the radial direction over the whole extension of the groove in the direction parallel to the rotation axis X. I.e. the groove with a peripheral side-edge of the groove base borders the edges 16 at one end of the groove. The groove with the peripherally opposite end of the groove base borders the edges 16 of the slots 14 at the opposite end of the groove in the direction of the rotation axis X. With the rotor shown in FIG. 3, this is the case in the middle of the rotor longitudinal direction, since there, the angle changes, and the groove runs back at the opposite angle, so that the groove at both end-sides is equally situated relative to the adjacent edges 16 of the slots 14.

Figure 4:
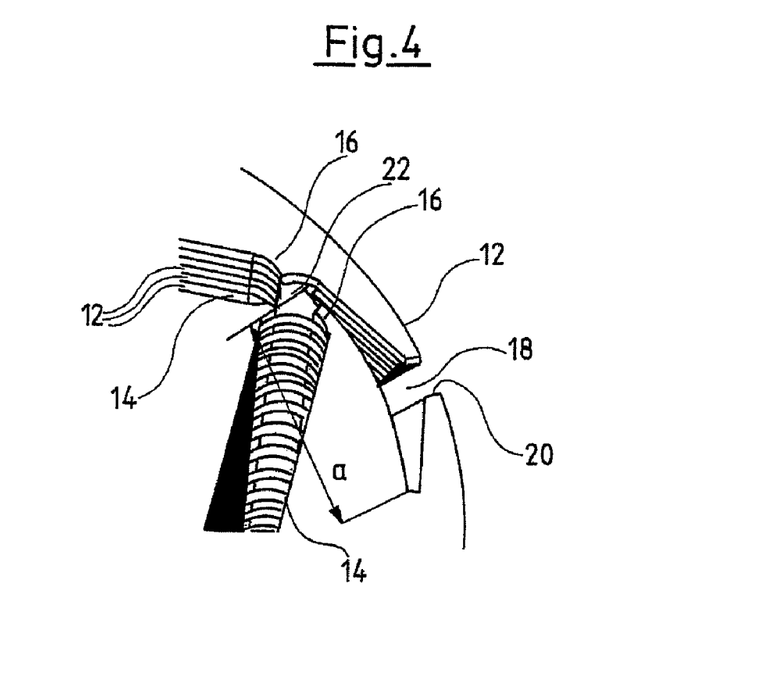

It may be further recognised in FIG. 4, that the groove 18 is directly connected to the adjacent slots 14 by an additional free space 22 in each second rotor lamination 12. This free space 22 leads to the fact that the parts of the rotor lamination at both poles of a permanent magnet inserted into the slot 14 are not connected via the rotor lamination in that rotor lamination in which a free space 22 is formed. Thus a magnetic insulation which prevents a magnetic short circuit in the inside of the rotor, is created by the free space 22. The free space 22 is omitted in each second rotor lamination. This serves for retaining the webs which hold the individual parts of the rotor together.

Figure 5:
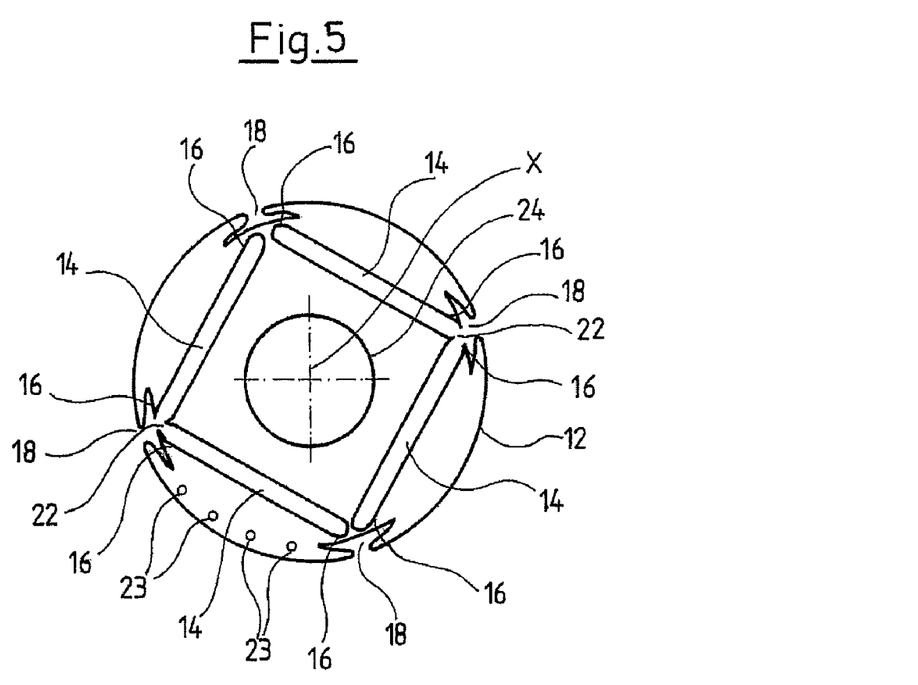
Figure 6:
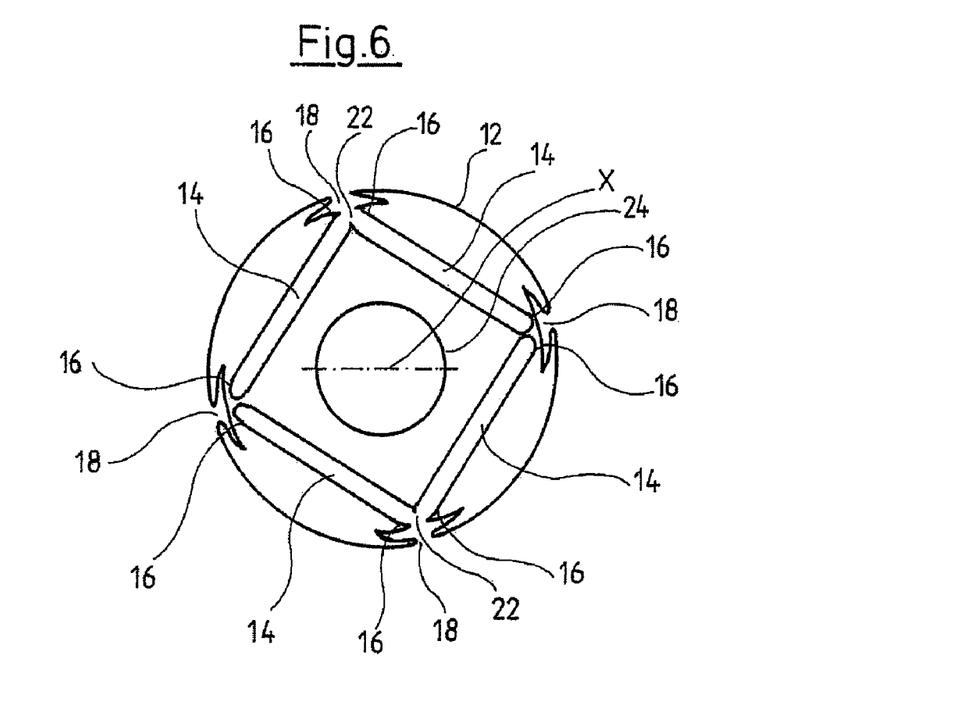

FIGS. 5 and 6 show two different rotor laminations of the rotor described by way of FIGS. 3 and 4. With the rotor laminations shown in FIGS. 5 and 6, it is the case of two rotor laminations 12 which come to lie directly on one another in the rotor. A circular hole 24 which serves for receiving the rotor shaft, is formed in the centre of the rotor lamination. It may be recognised in FIGS. 5 and 6, how the grooves 18 cover the edges 16 of the slots 14 in the radial direction. Furthermore, one may recognise that a free space 22 which connects the grooves 18 directly to the adjacent slots 14, connects in each case to two of the grooves 18. This free space is omitted on the two other grooves 18, in order to prevent the rotor lamination from falling apart. With the rotor lamination shown in FIG. 6, a free space 22 is accordingly formed on the two other grooves 18 at which no free space 22 is provided with the rotor lamination 12 according to FIG. 5. Thus a free space is formed in an alternating manner in each case at a groove 18 in one rotor lamination, in the next lamination no free space is formed, and in the subsequent lamination again a free space is formed, etc. The offset of the grooves 18 in the peripheral direction between the two laminations in FIGS. 5 and 6 may not be recognised on account of the small angle with rotor laminations 12 lying directly on one another.

A special design of the rotor for use in a line-start motor is furthermore indicated schematically in FIG. 5. For this application, additional channels 23 may be formed in the rotor close to the outer periphery, which are uniformly distributed around the periphery of the rotor between the grooves 18. In FIG. 5, the channels 23 are only represented between two grooves 18, but it is to be understood that the channels 23 are arranged distributed accordingly over the whole periphery of the rotor. The channels 23 preferably extend parallel to the grooves 18 and contain electrical leads. For this, the channels 23 are preferably cast out with copper. This arrangement of the electrical leads, permits the operation of the motor in the manner of an asynchronous motor, on starting, wherein then it may be operated as a permanent magnet motor after the start of the motor. It is to be understood that additional channels 23 may be optionally arranged, i.e. neither need to necessarily be present with the motor whose rotor laminations are shown in FIGS. 5 and 6.

Figure 7:
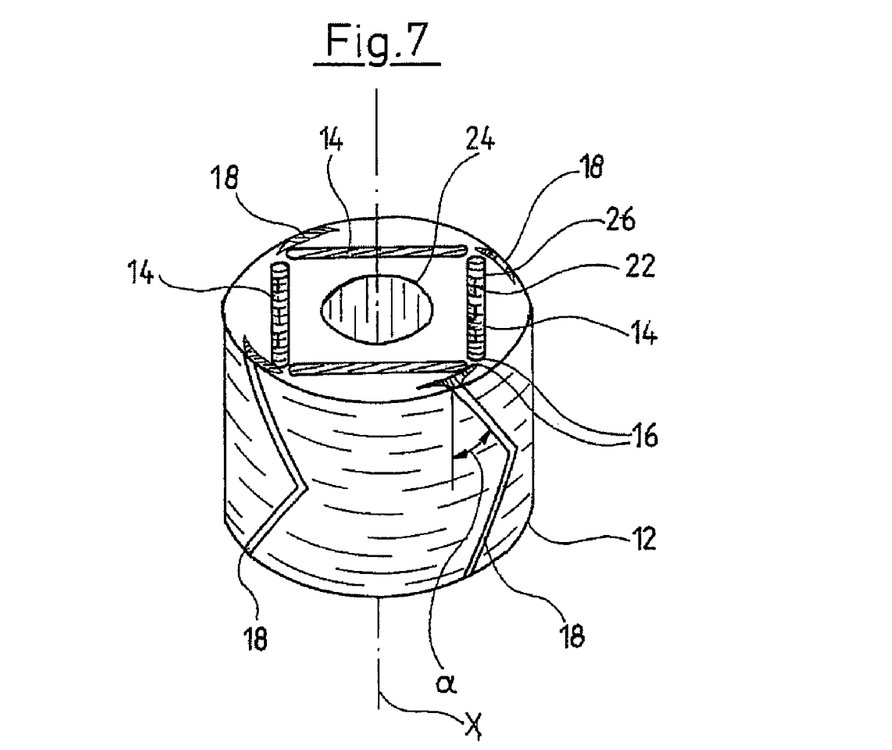
Figure 8:
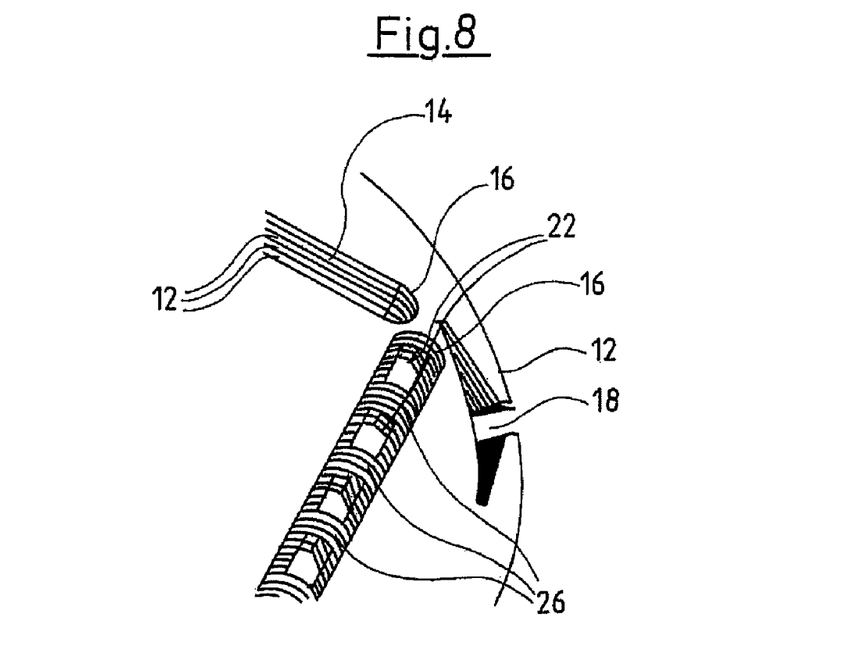

It is also possible instead of the alternating arrangement of the free spaces 22, as has been described by way of FIGS. 3 and 4, to always stack several rotor laminations 12 with the free space 22 at the same groove 18, onto one another, as is shown in FIGS. 7 and 8. The rotor shown in FIG. 7 corresponds essentially to that described by way of FIG. 3 to 6, with the single difference that here, the free spaces are designed longer in the direction of the rotation axis X, in that several rotor laminations 12 with the free space 22 at the same groove are always layered on one another, and several rotor laminations 12 which have no free space 22 at this groove, are not connected until afterwards. In this manner, the free spaces 22 in the direction of the rotation axis X have longer openings between the adjacent slots 14 and the groove 18, which in each case are separated by connection webs 26 which are longer in the direction of the rotation axis X.

Figure 9:
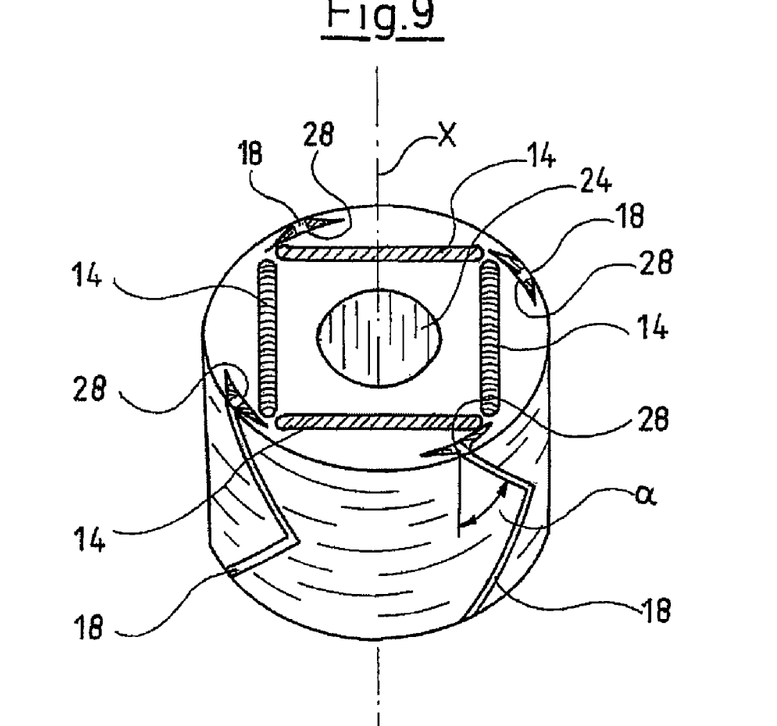
Figure 10:
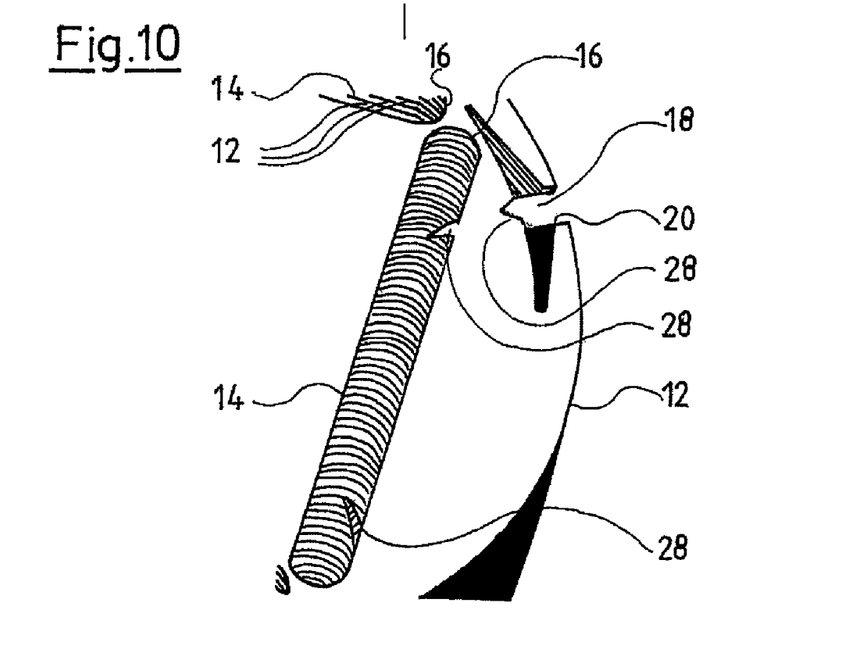

A further embodiment, which is based on the embodiment described by way of FIG. 3 to 8, is shown in FIGS. 9 and 10. With this rotor too, it is the case of a rotor which consists of a multitude of rotor laminations 12. Slots 14 and grooves 18 as have been previously described by way of FIGS. 3 to 8, are formed in these rotor laminations. In contrast to the previously described rotors, with the rotor according to FIGS. 9 and 10, no free spaces 22 are formed at the ends of the grooves situated in the peripheral direction, but notches 28 are formed in the middle of the grooves 18 in the radial extension of the gap 20 in the longitudinal direction of the grooves 18, and these notches penetrate radially inwards into the rotor lamination to such an extent, that they contact the slots 14 in sections, and thus create a connection between the slot 14 and the groove 18. The contacting of the slot 14 with the groove 18 takes place essentially in the region, in which the middle of the groove, i.e. the region in the radial extension of the gap 20, lies on the same radius as the edge 16. The notches 28 also have the purpose of interrupting the soft-magnetic material of the rotor lamination 12 at the end-side, i.e. in the region of the edges 16 of the slots 14, in order to prevent or reduce the magnetic flux between the poles of the magnet lying radially opposite to one another, in the inside of the rotor.

Figure 11:
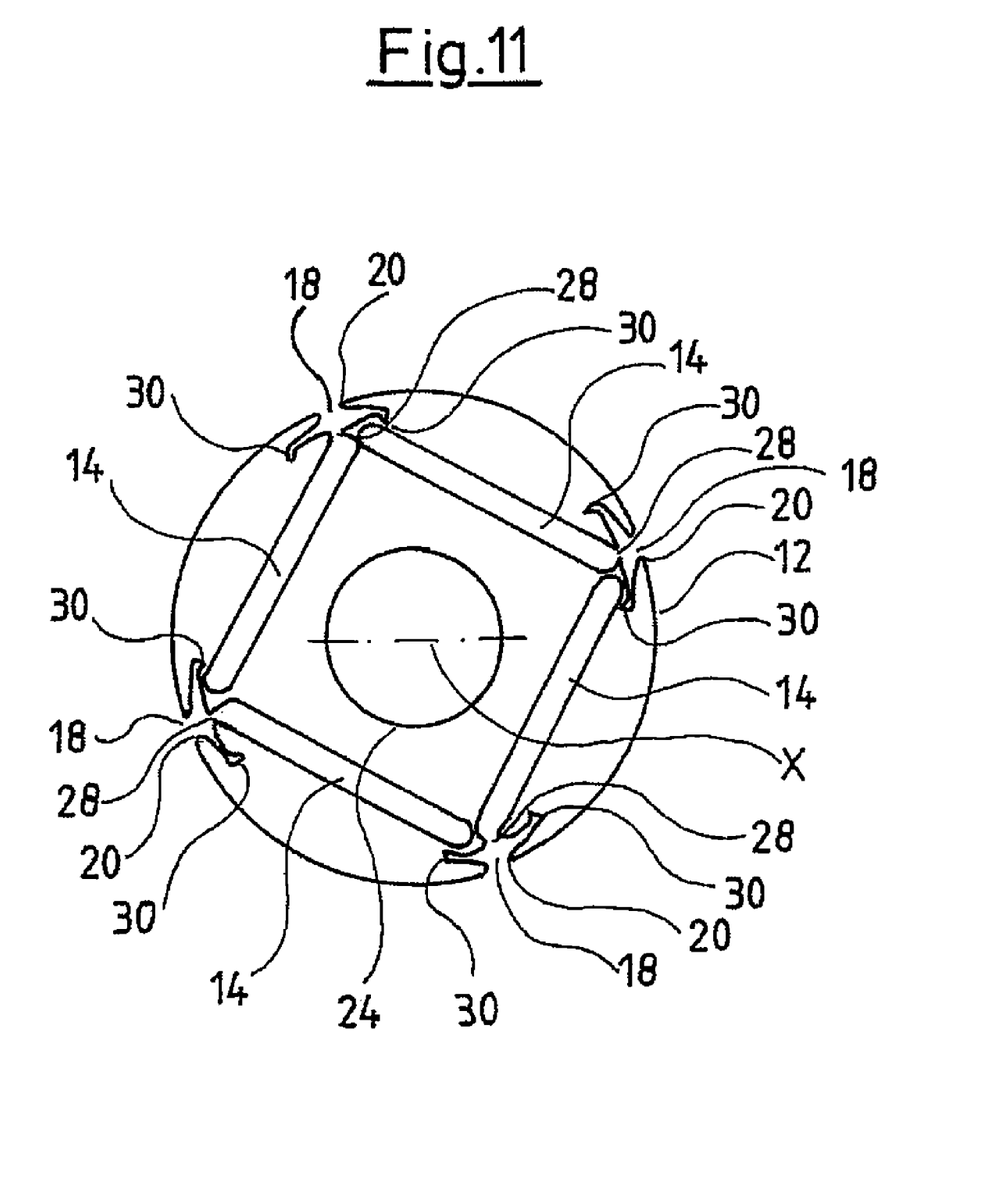

FIG. 11 shows a rotor lamination of a rotor similar to those in FIGS. 9 and 10, in a plan view. With this rotor lamination 12, further radially inwardly directed notches 30 are formed on the longitudinal edges of the grooves 18 which lie opposite to one another in the peripheral direction, additionally to the notches 28. Even larger incisions into the soft-magnetic material for preventing the magnetic flux or short circuit in the inside of the rotor between the permanent magnets inserted into the slots 14, is achieved by way of this. As may be further deduced from FIG. 11, the notches 28 always contact only one of the two slots 14 adjacent a groove 18. In this manner, it is ensured that webs remain between all regions of the rotor lamination 12, in order to hold together the rotor lamination and thus the finished rotor.

Hereinafter, the modular construction of a rotor according to the invention is described by way of FIGS. 12 and 13. The idea of the modular rotor construction lies in premanufacturing the individual rotor modules 32, and subsequently assembling the premanufactured rotor modules 32 into a complete rotor with a rotor shaft 34. This permits different numbers of premanufactured rotor modules 32 to be assembled in a simple manner according to the desired rotor length. Furthermore, as is described by way of FIG. 13, one may also premanufacture differently long rotor modules 32 which may then be joined together in the desired combinations, in order to form the desired rotor length.

Figure 12:
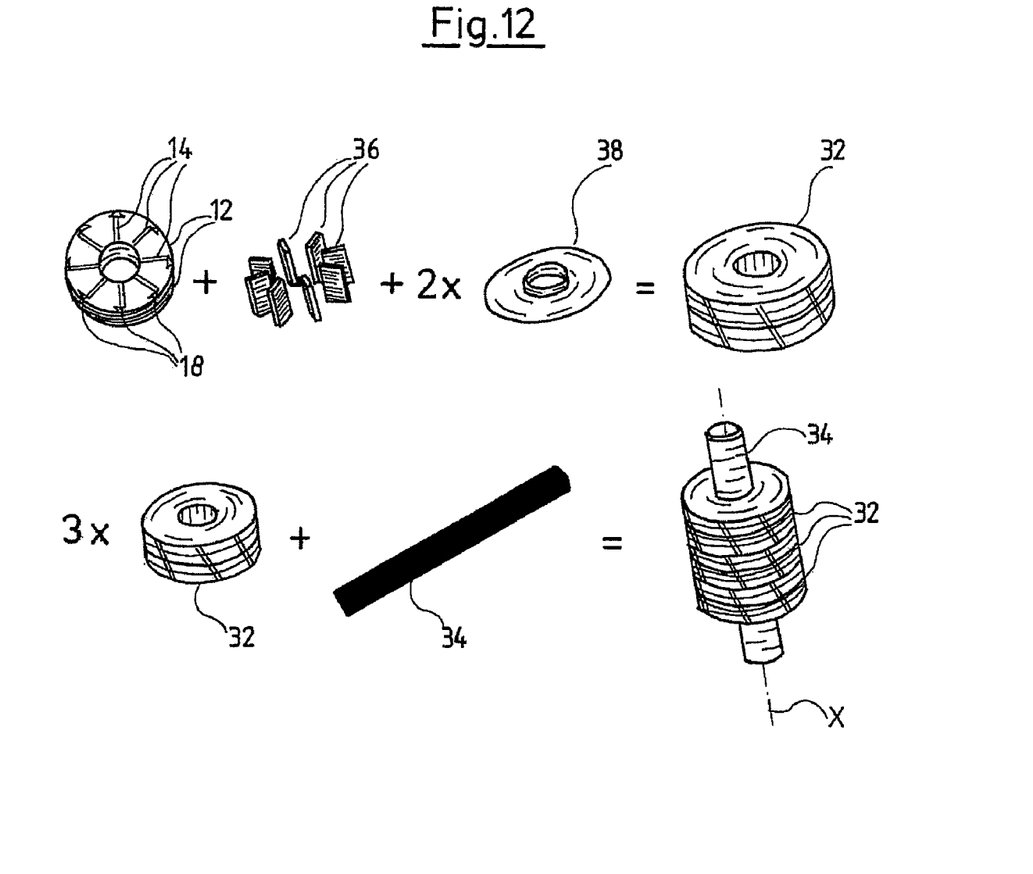

It is shown at the top in FIG. 12, how a rotor module 32 is constructed. Each rotor module 32 consists of a multitude of rotor laminations 12 which are layered on one another. With the example shown in FIG. 12, radially directed slots 14 for the permanent magnets or the permanent magnet sections 36 are provided in the rotor laminations 12. I.e., with the rotor described here, the permanent magnets 36 are arranged in a star-shaped manner in the radial direction. Alternatively, the described modular construction may however also be effected with an arrangement of the slots 14, which corresponds to the arrangement described by way of FIG. 3 to 10. Furthermore, the modular construction may also be realised with rotor segments 2 as have been described by way of FIGS. 1 and 2, wherein for this, rotor segments 2 in the length of the rotor module 32 in the direction of the longitudinal axis X are premanufactured.

Furthermore grooves 18 are formed in the rotor module and accordingly in the shown example, in the rotor laminations 12, in the previously described manner. Thereby, the grooves 18 run obliquely or inclined in the peripheral direction, wherein they cover the radial outer edges of the slots 14 over the whole length of the rotor module 32 in the direction of the axis X. Thereby, the groove width a and the inclination angle α, as previously described, are matched to one another, such that the groove at the one end-side of the rotor module 32 still just about covers the radial end-side of the slot 14 with its one peripheral end, and at the other end-side of the rotor module 32, the groove 18 with the peripherally opposite end still just covers the end-side of the slot 14. Thus a rotor module 32 corresponds to half of the rotor shown in FIGS. 3, 7 and 9, in the direction of the rotation axis X. The permanent magnet sections 36 are inserted into the rotor laminations 12 layered on one another in the longitudinal direction. Subsequently, the lamination bundle is provided with cover disks 38 at both end-sides, in order to form a rotor module 32. As the case may be, one may also do away with the cover disks 38. In the example shown in FIG. 12, then three rotor modules 32 premanufactured in this manner are placed onto a rotor shaft 34, in order to form a rotor with a length of 3 rotor modules 32. Thereby, the rotor modules 32 are arranged to one another such that the permanent magnet sections 36 of the individual rotor modules 32 are aligned to one another, i.e. extend parallel to the rotation axis X over the whole rotor length similarly to the continuous permanent magnets.

Figure 13:
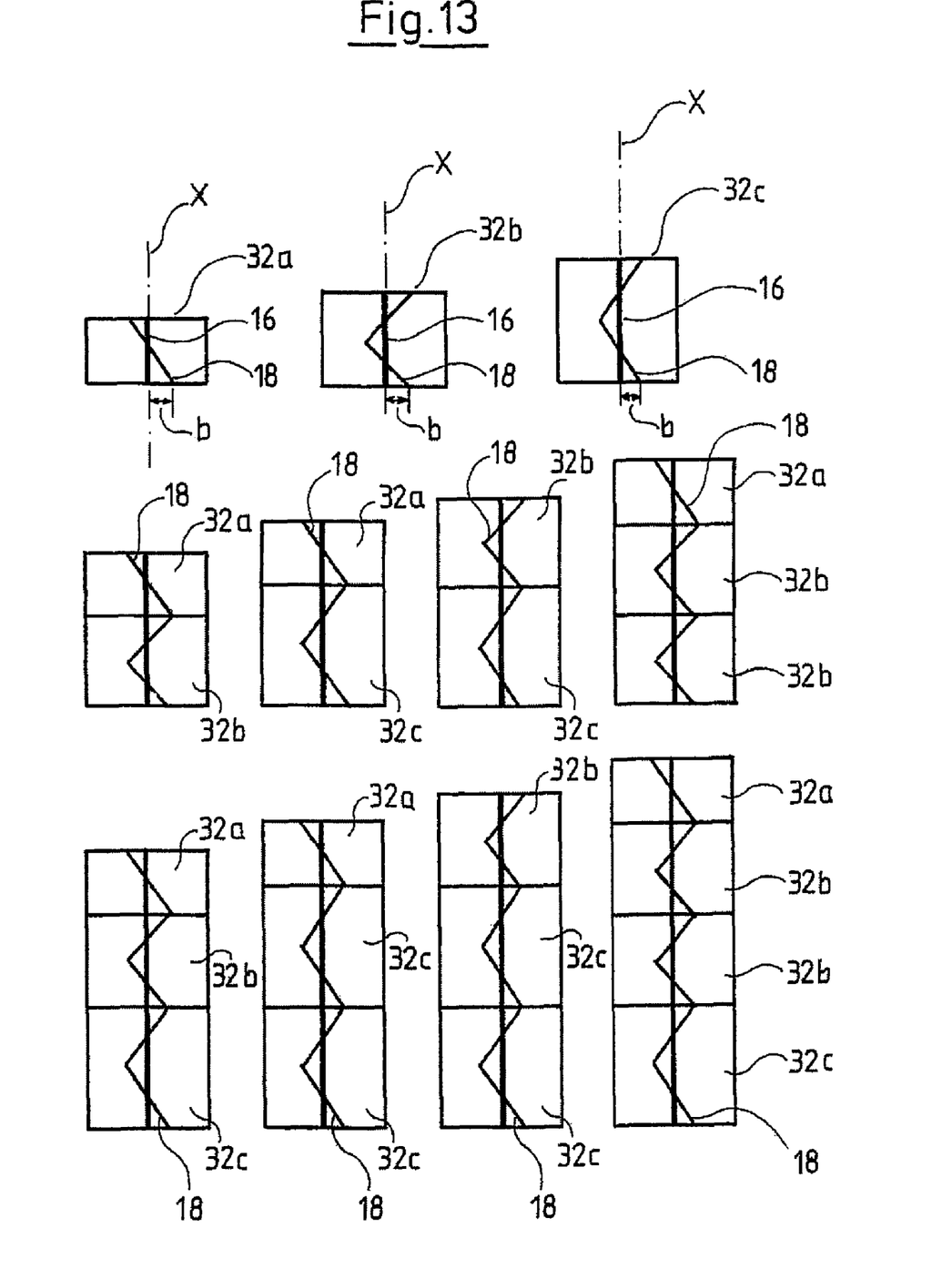

Now a construction of differently long rotors from differently long premanufactured rotor modules 32a, 32b and 32c is described by way of FIG. 13, wherein the individual rotor modules 32 are constructed as described by way of FIG. 12. For the sake of simplicity, the grooves 18 in FIG. 13 are only indicated by way of their centre lines. Furthermore, the longitudinal edges of the slots 14 or the permanent magnets or permanent magnet sections 36 are also shown only schematically. Only one longitudinal edge 16 and a groove 14 are represented at each rotor. It is to be understood that each rotor, distributed over its periphery, comprises several permanent magnets and associated longitudinal edges 16, as well as grooves 18.

As shown in FIG. 13 at the top, three differently long rotor modules 32a, 32b, and 32c are provided, which may be constructed from a multitude of rotor laminations 12 or of rotor segments 2, as is explained by way of FIGS. 1 and 2. In the shown example, the lengths are graduated such that the rotor module 32b is longer than the rotor modules 32a by half in the direction of the rotation axis X. The rotor module 32c has double the length of the rotor module 32 in this direction. The grooves 18 in the rotor module 32a extend on the outer periphery inclined in only one direction. With the rotor modules 32b and 32c, the grooves 18 extend in a zigzag manner as is explained by way of FIG. 3 to 11. The grooves 18 in the three differently long rotor modules 32a, 32b, 32c are inclined to the longitudinal axis of the rotor at different angles, so that the distance d between the longitudinal edge 16 and the groove 18 at the end-sides of the rotor modules 32a, 32b and 32c in the peripheral direction is equal, with all three rotor modules formed with a different length. This permits the rotor modules 32a, 32b and 32c to be joined together in infinite combinations in the longitudinal direction, wherein the groove sections or the grooves 18 of the individual rotor modules 32a, 32b, 32c contact or connect to one another at the interfaces, so that a continuous, as the case may be, zigzag-shaped groove 18 is formed with the finished rotor. This is not possible when several rotor modules 32a, with which the grooves or the groove sections 18 in the rotor module run straight and not in a zigzag fashion, are joined to one another, and then the grooves all run inclined in the same direction, as is shown in FIG. 12.

As is shown in FIG. 13, differently long rotors may be assembled from the rotor modules 32a, 32b and 32c, wherein the length graduation of the rotors which may be formed corresponds to half the length of the rotor module 32a in the direction of the rotation axis X. As may be recognised in the eight shown examples of the combinations of the different rotor modules 32a, 32b and 32c, the grooves 18 of the individual rotor modules 32a, 32b, 32c always connect to one another, so that continuous zigzag-like grooves 18 are formed over the entire rotor length, which all extend over the same predefined rotation angle of the rotor. With regard to the graduation of the rotor lengths, the shortest rotor may be formed alone by the rotor module 32a. The next longer rotor is formed alone by the rotor module 32b. A rotor which has double the length of the shortest one, may be formed alone by the rotor module 32c. A rotor which is longer once again by half the rotor module 32a, may be formed by a combination of a rotor module 32a and a rotor module 32b. The next longer rotor is formed by combination of a rotor module 32c and a rotor module 32a. Accordingly, the graduation proceeds up to the longest rotor shown in the example according to FIG. 13, which is formed from a rotor module 32c, two rotor modules 32b and a rotor module 32a. Of course one may also form even longer rotors with the system.

The advantage of this modular construction manner is the fact that one does not need to premanufacture differently long permanent magnets, but rather one may apply finished, pre-manufactured rotor modules onto one another in an infinite manner and in the manner of a kit, in order to be able to form differently long rotors in an inexpensive and simple manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A permanent magnet rotor for an electric motor, with which the permanent magnets (4; 36) extend in the inside of the rotor parallel to the rotation axis (X) of the rotor, and grooves open to the outside are formed in the region of the radially outer longitudinal edges (8; 16) of the permanent magnets (4; 36) on the outer periphery of the rotor, said grooves in each case running from one end-side of the rotor to an opposite end side of the rotor in an inclined or in an arcuate manner with respect to the outer longitudinal edge (6; 18) of the adjacent permanent magnets (4; 36) in the peripheral direction, characterized in that each groove (6; 18) includes a middle line that extends from the one end-side of the rotor to the opposite end-side of the rotor and crosses the outer longitudinal edge (8; 16) of the adjacent permanent magnet (4; 36) at least once, the grooves (6; 18) at the outer side of the rotor have a smaller width in the peripheral direction than in a region of the groove (6; 18) which lies radially further to the inside, and the cross-sectional shape of the groove (6; 18) is constant over the length of the rotor, the grooves (6; 18) being arranged such that in each case one groove (6; 18) covers the radially outer longitudinal edges (8; 16) of two circumferentially adjacent permanent magnets (4; 36) in the radial direction.

2. A permanent magnet rotor according to claim 1, characterized in that the rotor consists of at least two premanufactured rotor modules (32) which are joined to one another in the longitudinal direction (X), wherein permanent magnet sections (36) are arranged in each of the rotor modules (32), and each of the rotor modules (32) on its outer periphery comprises groove sections (6; 18), wherein when the rotor modules (32) are joined together, the groove sections (6; 18) of the individual rotor modules (32) together form the grooves (6;18), and the permanent magnet sections (36) of the individual rotor modules together form the permanent magnets (4) of the rotor.

3. A permanent magnet rotor according to claim 2, characterized in that the groove sections (6; 18) of each rotor module (32) are inclined to the longitudinal edge (8; 16) of the adjacent permanent magnet section (36), in a manner such that the middle lines of the groove sections (6;18) in the peripheral direction in each case have the same predefined distance (b) to the longitudinal edge (8; 16) of the permanent magnet section (36), at each end-side of the rotor modules (32).

4. A permanent magnet rotor according to claim 2, characterized in that the middle line of each groove section (6; 18) crosses the longitudinal edge (8, 16) of the adjacent permanent magnet section (36) at least once.

5. A permanent magnet rotor according to claim 2, characterized in that the rotor comprises at least two rotor modules (32) which are differently long in the direction of the rotation axis (X) of the rotor.

6. A permanent magnet rotor according to claim 2, characterized in that at least one of the rotor modules (32) comprises groove sections (6; 18), which are in each case designed in an angled manner, such that the middle lines of the groove sections (6; 18) at the two opposite end-sides of the rotor module (32) in the peripheral direction, are distanced equally far from the longitudinal edge (8, 16) of the permanent magnet (4; 36) in the same direction.

7. A permanent magnet rotor according to claim 1, characterized in that the grooves (6; 18) and/or the groove sections (6; 18) run in a zigzag manner with respect to the outer longitudinal edge (8; 16) of the adjacent permanent magnet (4) or permanent magnet section (36).

8. A permanent magnet rotor according to claim 1, characterized in that the grooves (6; 18) have a swallowtail-shaped cross section.

9. A permanent magnet rotor according to claim 1, characterized in that free spaces (22; 28) are formed adjacent to the longitudinal edges (8; 16) of the permanent magnets (4; 36) in the surrounding material of the rotor, said free spaces preferably being in connection with an adjacent groove (6; 18).

10. A permanent magnet rotor according to claim 9, characterized in that the rotor is formed of a multitude of rotor laminations (12) layered on one another, wherein the free spaces (22; 28) are only formed in a part of the rotor laminations, and preferably extend between two adjacent permanent magnets (14; 36).

11. A permanent magnet rotor according to claim 1, characterized in that the rotor or individual rotor modules (32) are formed of a multitude of rotor laminations (12) or of assembled, solid, preferably sintered segments (2), wherein receiver spaces for the permanent magnets (4) are formed between the segments (2) which are adjacent to one another.

12. A permanent magnet rotor according to claim 1, characterized in that electrical leads are arranged in at least a part of the grooves (6; 18) or in additional channels (23) formed in the rotor.

13. A method for manufacturing a permanent magnet rotor according to claim 1, with which
- the rotor is assembled from a multitude of rotor laminations (12),
- wherein the individual rotor laminations (12) are consecutively punched in the sequence in which they are assembled, and the tool for punching the grooves (18) on the outer periphery of the rotor is rotated about its longitudinal axis (X) by a predefined angle after each punching procedure, in order to form the grooves (18) which are inclined with respect to the longitudinal edges (16) of the permanent magnets (4; 36), on the outer periphery of the rotor, and
- permanent magnets (4; 36) which fit with the length of the rotor are inserted into the rotor after assembling the rotor laminations (12) into a rotor.

14. A method according to claim 13, with which the rotor is assembled of at least two premanufactured rotor modules (32), wherein
- the rotor modules (32) in each case are assembled from a multitude of rotor laminations (12),
- the individual rotor laminations (12) of a rotor module (32) are consecutively punched in the sequence in which they are assembled, and the tool for punching the grooves (18) on the outer periphery of the rotor is rotated by a predefined angle about its longitudinal axis (X) after each punching procedure, in order to form the groove sections (18) which are inclined with respect to the longitudinal edges (16) of the permanent magnets (4; 36), on the outer periphery of the rotor module (32), and
- permanent magnet sections (36) fitting with the length of the rotor module (32) are inserted into the rotor module after the assembly of the rotor laminations (12) into this rotor module (32).

15. A method according to claim 14 for forming rotors with different lengths, with which rotor modules (32) of a certain length are premanufactured, in which permanent magnet sections (36) are arranged, which extend parallel to the rotation axis (X) of the rotor module (32) over its axial length, and the rotor modules (32) in each case comprise groove sections (18) on the outer periphery, which are inclined to a radially outer longitudinal edge (16) of an adjacent permanent magnet section (36), and depending on the desired rotor length, a different number of rotor modules (32) are joiner together in the longitudinal direction (X), in a manner such that the permanent magnet sections (36) of the individual rotor modules (32) together form permanent magnets (4) which extend through the rotor in the axial direction.

16. A method according to claim 15, with which at least two, preferably three types of rotor modules (32) with a different module length are provided.

17. A method according to claim 16, with which a second type of rotor module (32*b*) has a module length which is longer than the module length of the first type of rotor module (32*a*) by half, and preferably a third type of rotor module (32*c*) is provided, which has a module length which has double the length of the module length of the first type of rotor module (32*a*).

\* \* \* \* \*